(12) United States Patent
Di Lalla

(10) Patent No.: US 8,024,850 B2
(45) Date of Patent: Sep. 27, 2011

(54) METHOD OF TIGHTENING DUCTS

(76) Inventor: Joseph Di Lalla, Chesterland, OH (US)

( * ) Notice: Subject to any disclaimer, the term of this patent is extended or adjusted under 35 U.S.C. 154(b) by 1019 days.

(21) Appl. No.: 11/973,283

(22) Filed: Oct. 5, 2007

(65) Prior Publication Data
US 2008/0104824 A1 May 8, 2008

Related U.S. Application Data

(60) Provisional application No. 60/864,622, filed on Nov. 7, 2006.

(51) Int. Cl.
*B23P 11/00* (2006.01)
(52) U.S. Cl. .................. 29/525.01; 29/525.08; 29/243.5; 29/238
(58) Field of Classification Search .............. 29/525.01, 29/525.08, 243.5, 238, 243.56, 270, 271, 29/275, 281.5
See application file for complete search history.

(56) References Cited

U.S. PATENT DOCUMENTS

| | | | | | |
|---|---|---|---|---|---|
| 1,900,314 | A | * | 3/1933 | Strom | 7/100 |
| 3,887,986 | A | * | 6/1975 | Walton | 29/271 |
| 4,649,613 | A | * | 3/1987 | Bednarik | 29/253 |
| 4,713,959 | A | * | 12/1987 | Bennett | 72/409.18 |
| 5,020,202 | A | * | 6/1991 | Turrell | 29/243.56 |
| 5,594,982 | A | * | 1/1997 | Dobbeck | 29/243.5 |
| 5,661,886 | A | * | 9/1997 | Smith | 29/243.56 |

OTHER PUBLICATIONS

Klenk—Combo drive tool advertisement published prior to Nov. 7, 2006.
Klenk Tools—Combo Drive Tool Adv., Published prior to Nov. 7, 2006.

* cited by examiner

*Primary Examiner* — David Bryant
*Assistant Examiner* — Bayan Salone

(57) ABSTRACT

A tool for drawing duct sections together is formed of a U-shaped steel section. The center pane of the U has a V-shaped notch that is slipped behind the flanges of duct sections. The V draws the duct sections together as the tool is moved into place. When the tool is in place, a cleat can be inserted over the flanges from the same direction as the tool was installed. Because of the gauge of material used to make the tool, the cleat and the tool both fit behind the flanges of the of the ducts, allowing the cleat and tool to be installed from the same side of the duct. After the cleat is in place, the tool can be removed.

5 Claims, 2 Drawing Sheets

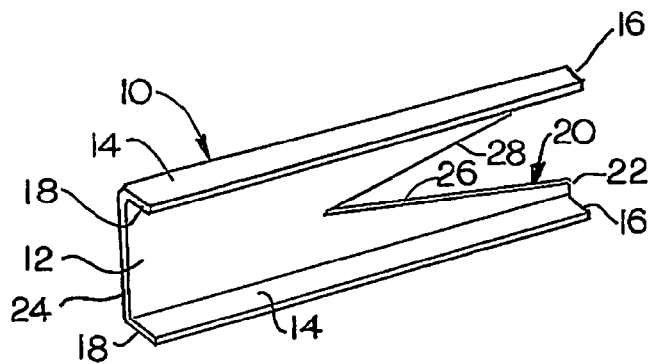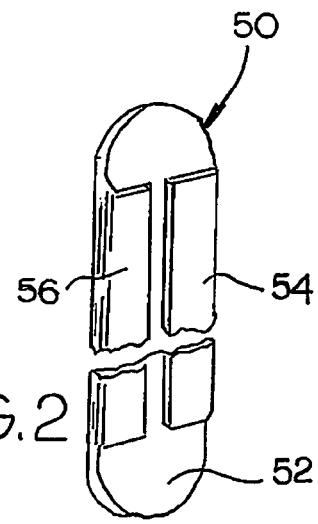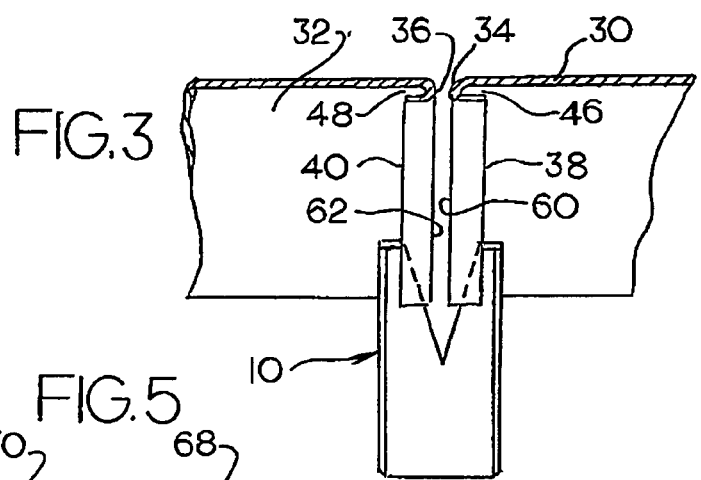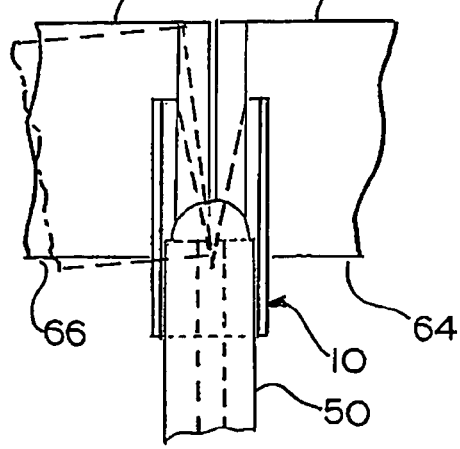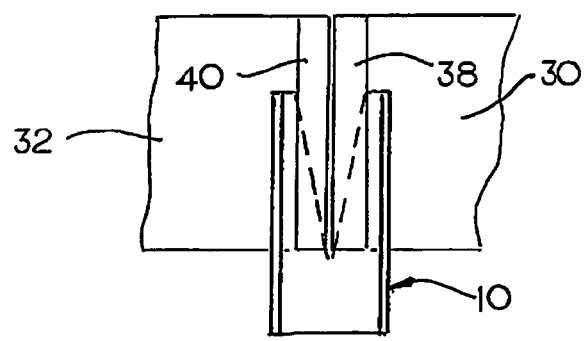

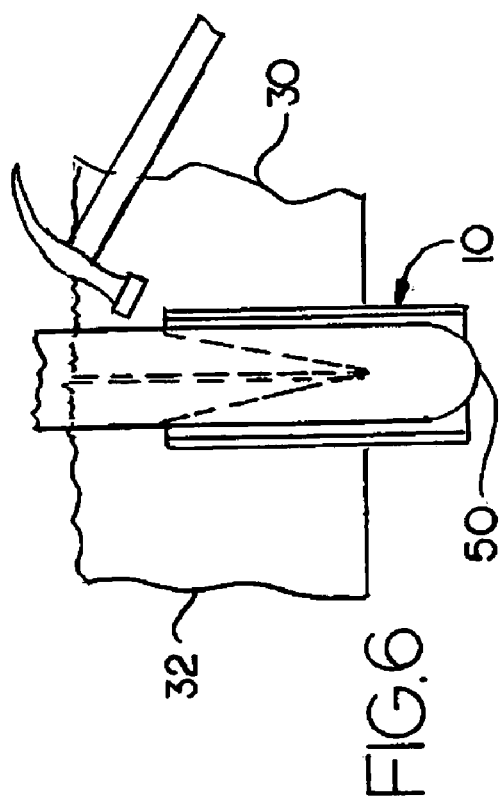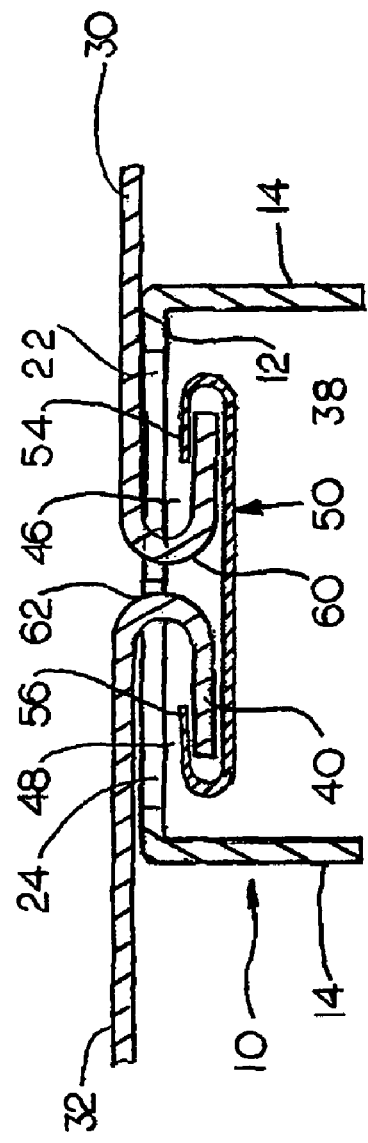

METHOD OF TIGHTENING DUCTS

This application claims the benefit of U.S. Provisional Application No. 60/864,622, filed Nov. 7, 2006.

FIELD OF THE INVENTION

The disclosure and the invention claimed herein relate to hand tools useful in drawing together duct sections that have a return flange termination, and to methods for using such a tool.

BACKGROUND

Ducts made of sheet metal are fabricated in sections that require assembly. Sections of duct that are rectangular in cross-section typically include drive ends that have a return flange on opposite edges. In a typical installation, the drive ends are oriented so that the edges with return flanges are vertical. When two sections are brought together, the edges where the sheet metal is bent back to form the flanges must be brought close together so that a cleat can be slid over the flanges to hold the sections together.

Several tools are known for this purpose. One has a handle with a pair of narrow wheels mounted on it. The wheels are spaced apart along the length of the tool and are proportioned to fit in the groove between the wall of the duct and the return flange. When the wheels are in place, one the each groove, the tool can be used like a lever to draw the sections together. Another tool has a pair of jaws. See U.S. Pat. No. 5,020,202. Another is a simple tool with the V-shaped notch shown in U.S. Pat. No. 5,594,982.

This last may be effective in some settings but lacks certain advantages of the herein disclosed invention in that it cannot be used when access to one side of the duct is limited because the tool and the cleat must be installed from opposite directions. In addition this tool cannot be used effectively if it fails to draw the entire length of the drive ends of the ducts into close proximity because there is not room in the groove formed between the duct and the flange for both the tool and the cleat.

SUMMARY

The tool disclosed in this application has a V-shaped notch to draw together the return flanges of adjacent duct sections. The tool is formed of relatively thin sheet material so there remains between the tool and the flanges enough room for a cleat to be installed while the tool remains in place. The tool is generally U-shaped with its legs providing striking surfaces for a hammer to install and remove the tool. The tool thus enables a method of assembly of ducts in which the tool and the cleat are installed from the same direction.

DESCRIPTION OF FIGURES

FIG. 1 is a perspective illustration of a tool made following the teachings of this disclosure.

FIG. 2 is a perspective illustration of a conventional cleat used to join adjacent duct sections to each other.

FIG. 3 shows a tool made following this disclosure at an initial stage of use.

FIG. 4 shows the tool and duct sections of FIG. 3 drawn together and ready for installation of a cleat.

FIG. 5 shows the tool and duct sections of FIG. 4 together with a cleat in an initial stage of installation; FIG. 5 also shows in phantom lines a duct in an alternative position in which the drive ends of the ducts have not been drawn into parallelism.

FIG. 6 shows two duct sections with a cleat installed over the flanges and a hammer about to strike the tool to remove it.

FIG. 7 is a cross-sectional view looking in the direction of arrows 7-7 of FIG. 6.

DESCRIPTION

The tool 10 is formed in a flat U-shape. It has a planar main body 12 and a pair of lateral walls 14 that extend from the main body. It may be convenient to make the walls 14 generally perpendicular to the main body 12 but this is not necessary. The walls 14 could be formed at any angle from about 30° to about 150° with respect to the main body 12. In accordance with well-known engineering principles, the tool 10 is stiffest if the side walls 14 are more or less perpendicular to the main body 12. As is discussed below, the end faces 16, 18 of the lateral walls 14 provide striking surfaces to install and remove the tool, and any angle of the lateral walls 14 that provides sufficient stiffness and provides adequate striking surfaces may prove satisfactory. If the lateral walls 14 are perpendicular to the main body then a wall height of approximately ½" has provided good stiffness to the tool 10 and adequate striking surfaces 16, 18. The tool 10 could be made with only a single wall 14, but having two walls has generally proven convenient.

The main body 12 of the tool 10 is about 5½ inches long and a half as wide. A V-shaped slot 20 is cut in the main body 12 extending from the top edge 22 toward the bottom edge 24 of the main body. The edges 26 and 28 of the V-shaped slot 20 define a 22½° angle. This angle has proven effective in drawing the drive ends of duct sections together. Other tapers are possible provided they provide an adequate wedge-like action to draw the duct sections together. The tool 10 is intended to be used with conventional duct sections 30, 32. Such duct sections 30, 32 are generally rectangular in cross-section. As conventionally formed such duct sections 30, 32 have drive ends 34, 36 that are formed with return flanges 38, 40 on the vertical edges. The return flanges 38, 40 are formed by bending a tab of sheet metal through a 180° turn until it extends parallel or nearly so to the wall of the duct. The return flanges 38, 40 and the respective duct walls define a grooves 46, 48 and that are approximately 1/16" wide and extend the length of the tab, typically nearly the entire height of the duct section 30, 32. The tab is about ½" long so that when it is folded back the resulting groove is 1/16" wide and ½" deep. A cleat 50 is shown in FIG. 2. The cleat 50 is formed to engage a pair of return flanges 38, 40, one on each of the sections 30, 32, and hold the drive ends 34, 36 of their respective ducts tightly against each other. Therefore the cleat 50 has a main body 52 about one half inch wide and return arms 54, 56 that are slightly less than 1 inch wide. This arrangement forms an opposed pair of bends that are 1 inch apart. When the cleat 50 is installed on the return flanges 38, 40 of a pair of duct sections 30, 32, the duct sections are held tightly or at least closely to each other.

As shown in FIG. 7 the main body 12 of the tool 10 is of a thickness that both it and the cleat 50 will fit in the grooves 46, 48 between the return flanges 38, 40 and the walls 42, 44 respectively, of the duct sections 30, 32. The grooves 46, 48 behind the return flanges 38, 40, respectively are each approximately 0.0625 inches wide. The main body of the tool is made of 18 gauge sheet steel which is approximately 0.050 inches thick. This leaves a space of about 0.0125 inches for the cleat 50 to get started. Since the cleat 50 is made of 24 gauge (residential) or 20 Or. 22 gauge (commercial) galvanized steel, it has a thickness of between 0.0276 and 0.0396 inches, and there is a slight interference fit to get the cleat started under the return flanges 38 and 40. In FIG. 7 the clearances have been exaggerated for clarity; in reality, there is a slight interference fit so there is sliding contact between the various pieces until the tool 10 is removed.

Once the leading edge 58 of the cleat 50 is wedged under the return flanges 38, 40, the sheet metal at the bends 60, 62 at the leading ends of the duct sections may flex slightly to allow the cleat to be driven along the flanges. In a perfect world on a perfect jobsite the two drive ends of adjacent duct sections always line up perfectly along their entire lengths, as shown in solid lines in FIGS. 4 and 5. In the real world, the duct sections are usually at least partially misaligned as, for example, shown by the phantom lines in FIG. 5. The tool 10 can be used to draw one end of the duct sections 30, 32 together (the bottom edges 64, 66 as oriented in FIG. 5).

The cleat 50 can be used to draw the duct sections 30, 32 into alignment along the remainder of their entire lengths. After the tool 10 is in place, the cleat 50 is started from the same end of the grooves. As the cleat 50 is moved along the length of the grooves (upward as shown in FIG. 5), the cleat draws the tops 68, 70 of the duct sections together. When the bottom 72 of the cleat 50 reaches the lower end face 18 of the tool 10, it may no longer convenient to hammer the cleat upward, and so the tool is removed, typically by striking it with a hammer as illustrated schematically in FIG. 6. Until this is done, the snug fit of the tool 10 and cleat 50 in the grooves 46, 48 assures that the tool will not fall. After the tool is removed, the cleat 50 can be shifted to its final position.

Thus the simple expedient of assuring that the thickness of the main body 12 of the tool 10 is not too large makes it possible to "piggyback" the cleat 50 on top of the tool in the grooves 46 and 48 as shown in FIGS. 5-7. This in turn allows the tool 10 and the cleat 50 to be installed from the same side of the duct sections, a distinct advantage when clearance on the other side of the duct sections is limited. In addition, installing the cleat 50 from the same side as the tool 10 allows the cleat to draw the facing duct sections toward each other.

What is claimed is:

1. A method of tightening duct sections, each section having a wall and a return flange along an edge to define a groove between the wall and the return flange that extends along the edge, the grooves of adjacent duct sections being adapted to receive a retaining cleat with a pair of arms, each arm proportioned to fit in a groove when the edges of the duct sections are drawn adjacent to each other, said method comprising placing two duct sections in an initial position where the ducts are generally aligned with each other, positioning a tool having a V-shaped slot with each edge of the V-shaped slot engaging an end portion of one of the grooves and pressing the tool so that as the edges of the duct sections move toward the bottom of the V-shaped slot they are forced by the walls of the V-shaped slot toward each other, inserting a cleat over the returns with one arm in each groove starting at said end portions of the grooves while the edges of the V-shaped slot remain in the grooves, and thereafter removing the tool.

2. The method of claim 1 wherein the step of positioning the tool includes positioning a tool with a planar main body and a pair of lateral walls generally transverse to the main body and positioning the main body of the tool generally parallel to the walls of the ducts.

3. The method of claim 2 wherein the step of positioning a tool includes driving the tool with a hammer.

4. The method of claim 2 wherein the step of removing the tool includes striking one or more of the lateral walls of the tool with a hammer.

5. The method of claim 2 wherein the step of positioning a tool includes the step of selecting a tool with main body whose thickness is sufficiently less than the width of the groove that the groove can also accommodate an arm of a cleat.

\* \* \* \* \*